United States Patent

[11] 3,535,977

| [72] | Inventor | Morton Z. Baumgarten<br>Elizabeth, New Jersey |
|---|---|---|
| [21] | Appl. No. | 795,479 |
| [22] | Filed | Jan. 31, 1969 |
| [45] | Patented | Oct. 27, 1970 |
| [73] | Assignee | Charter Wire, Inc.<br>a corporation of Wisconsin |

[54] DUAL FUNCTIONING SPLIT RETAINING RING
7 Claims, 5 Drawing Figs.

[52] U.S. Cl. .................................... 85/8.8, 287/53
[51] Int. Cl. .................................... F16b 21/16
[50] Field of Search.......................... 85/8.8, 8.6, 51; 287/53; 151/69

[56] References Cited
UNITED STATES PATENTS
3,431,809  3/1969  Frailly .................... 85/8.8
3,460,427  8/1969  Baumgarten ............. 85/8.8

*Primary Examiner*—Ramon S. Britts
*Attorney*—Pennie, Edmonds, Morton, Taylor and Adams ABSTRACT: A split retaining ring formed of drawn flat spring wire has opposite smooth parallel face portions, concentric inner and outer curved peripheral surfaces and an oblong rectangular cross section. Each of the split ends of the ring is provided with a pair of keyhole-shaped slots, one relatively near to the tip of the end and opening at the inner curved periperal surface, and the other relatively far from the tip and opening at the outer curved peripheral surface. These slots avoid problems of registry and undesirable deformation of metal that would be encountered if conventional holes were attempted to be used in their stead and, at the same time, cooperate adequately with the working fingers of a ring-handling tool with which the ring may be expanded or contracted to install it in an outwardly opening groove in a shaft or an inwardly opening groove in a housing, respectively.

Patented Oct. 27, 1970

3,535,977

INVENTOR
MORTON Z. BAUMGARTEN

BY
Pennie, Edmonds, Morton, Taylor and Adams
ATTORNEYS

DUAL FUNCTIONING SPLIT RETAINING RING

This invention relates to a split retaining ring which may be installed in either an outwardly opening groove in a shaft or an inwardly opening groove in a housing to prevent axial displacement relative to the shaft or housing of a machine part mounted adjacent the split ring.

Split retaining rings having concentric inner and outer peripheries for installation in either outside or inside grooves have been proposed in the prior art, and in all cases some means must be provided for expanding and contracting the rings during installation. Typically, the prior art has suggested use of projecting tabs or slots at the split ends of the ring for this purpose, such elements being designed to cooperate with a ring-handling tool by which expansion or contraction pressure is applied manually. However, tabs are difficult to hold and manipulate with the ring-handling tool, and slots cannot be used for lack of sufficient radial width in the smaller ring sizes, i.e., those having an inside diameter of about 1.5 inches and a radial width of about 0.16 inch.

Similar problems were encountered by the present applicant in attempts to use holes in the split ends of rings as the openings that would receive rod-shaped working fingers of a ring-handling tool. A single hole in each split end of the ring was not feasible because its diameter would have had to have been almost as large or larger than the radial width of the ring in order for the hole to be sufficiently exposed above the tops of both outside and inside grooves to permit insertion of the tool working fingers in either case. Another attempt to use a pair of smaller diameter holes in each split end of the ring, one radially offset toward the inner curved periphery for adequate exposure above the top of an inside groove and the other radially offset toward the outer curved periphery for adequate exposure above the top of an outside groove, also caused problems because the thin amount of metal left remaining between the holes and the curved peripheries closely adjacent thereto could not withstand the stamping operation for punching out the holes without permanently bulging radially by cold flow and thereby distorting the smooth curvature desired for the curved peripheries.

The present invention is based upon the discovery that the foregoing problems can be overcome by providing a dual functioning split retaining ring with particular forms of openings in the split ends thereof. More particularly, in a split retaining ring embodying the invention, each split end is provided with a pair of slots, one of the slots in each pair being relatively near to the tip of the split end and having a closed end spaced from one of the inner and outer curved peripheries and extending radially to an open end located at the other of said peripheries, and the second of the slots being relatively farther from the tip of the split end and also having a closed end spaced from that one of the inner and outer curved peripheries opposite to the one spaced from the closed end of the first slot and also extending radially to an open end at the other of said peripheries opposite to the one at which the open end of the first slot is located, with the maximum transverse distance bridging across the closed end of each slot being greater than the maximum transverse dimension of the radially extending portion of the slot.

With the foregoing construction, there is no problem of deformation of thin metal between radially offset holes and an adjacent curved periphery as previously described because, instead, such metal is completely removed in the area of the radially extending portion of the slot which terminates in an open end coincident with the curvature of the periphery. Yet, since the maximum transverse distance bridging across the closed end of the slot is made larger than the maximum transverse dimension or width of the radially extending portion, the closed end is bulged in relation to the radially extending portion, and suitably dimensioned working fingers of a ring-handling tool can be inserted axially into the open space of the closed end without danger of sliding free of the ring through the radially extending portion of the slot. Thus, proper cooperation between the slots and the ring-handling tool is assured even if the slots are so oriented that the working fingers of the tool partially project into the radially extending portions of the slots during application of contraction or expansion pressure. Of course, the construction embodying the principles of the invention also permits the bulged closed ends of the slots to be sufficiently offset from the center line which divides the radial width of the ring in half to expose one set of closed ends above the top of an outside groove and another set of closed ends above the top of an inside groove for free insertion and withdrawal of the working fingers of the ring-handling tool during and after installation in either case.

A further advantage is achieved if the slots are made generally keyhole shaped with the closed ends of the first slots in each pair being radially offset towards, and extending to open ends located at, the inner curved periphery of the ring and with the closed ends of the second slots in each pair being radially offset towards, and extending to open ends located at, the outer curved periphery. In this embodiment, the opposite first slots in the opposite split ends of the ring are operated with a contraction pressure to contract the ring for installation in an inwardly opening groove within the bore of a housing, and since the second slots are located in the portion of the ring being tensioned and deformed by this pressure, the portions of the ring extending from the closed ends of the second slots to the tips of the split ends are capable of resiliently flexing to assist in achieving sufficient clearance for the outer curved peripheries of these portions to enter the hollow bore of the housing. This is very important since it is much more difficult to contract the ring without severe elliptical distortion than to expand it, and the capability of resilient flexure described above helps to counteract problems that otherwise could be caused by such elliptical distortion in not achieving sufficient clearance of the bore.

Further details of the invention will be readily understood by reference to the accompanying drawings which illustrate a preferred embodiment thereof and of which:

Figure 2:
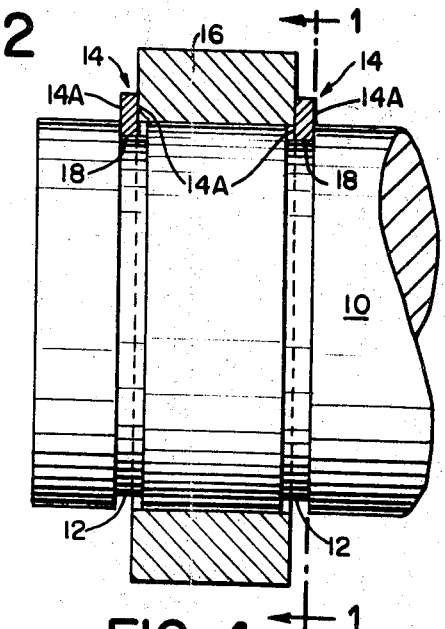
FIG. 2 is a longitudinal view partly in section taken along the plane of line 2–2 in FIG. 1.

Referring now to FIG. 2, the exterior surface of a shaft 10 has two outwardly opening circular grooves 12 in which split rings 14 embodying the inventions are installed on opposite sides of a machine part 16 to hold the part against axial displacement relative to the shaft. Each ring 14 has opposite smooth parallel face portions 14A and an oblong rectangular cross section, the term "oblong" denoting that the longer dimension of the cross section is in the plane of the ring.

Figure 1:
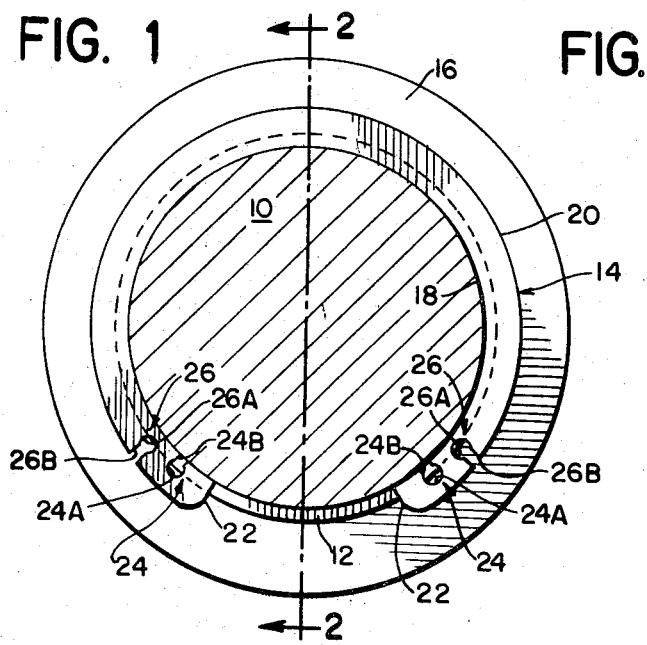
FIG. 1 is a transverse sectional view, taken along the plane of line 1–1 in FIG. 2, showing a split ring embodying the invention installed in an outwardly opening groove on a shaft.

As seen in FIG. 1, each ring 14 also has concentric inner and outer curved peripheral surfaces 18 and 20, respectively, which extend smoothly to the tips 22 of the split end portions of the ring. The inner peripheral surface 18 intersects the tips 22 of both end portions at substantially right angles to form sharp corners at such intersections, and the outer peripheral surface 20 intersects the tips of both end portions in smooth curves to form rounded corners at such intersections.

Each end portion of ring 14 is provided with a pair of slots 24, 26 of which slot 24 is positioned relatively near and slot 26 relatively farther from the tip 22 of the end portion. Both slots 24 have closed ends 24A and extend substantially radially inwardly to open ends 24B at the inner peripheral edge 18. Similarly, both slots 26 have closed ends 26A and extend substantially radially outwardly to open ends 26B at the outer peripheral edge 20.

All of the slots 24, 26 are each generally keyhole shaped, with the closed ends 24A and 26A forming the circular bulged portion and the radial extensions to the open ends 24B and 26B forming the linear narrower portion of such shape. Thus, the maximum transverse dimension bridging across the closed ends 24A and 26A, in this case the diameters, is greater than the maximum transverse width of the radially extending portions of the slots. The closed ends 24A of slots 24 are centered on points displaced radially inwardly from the center line which divides the radial width of the ring 14 in half, and the closed ends 26A of slots 26 are centered on points displaced radially outwardly from the center line. Accordingly, the curved closed ends 24A and 26A of the slots 24 and 26 are all offset into closer proximity to the inner and outer curved peripheral edges 18 and 20, respectively, of the ring 14.

Figure 5:
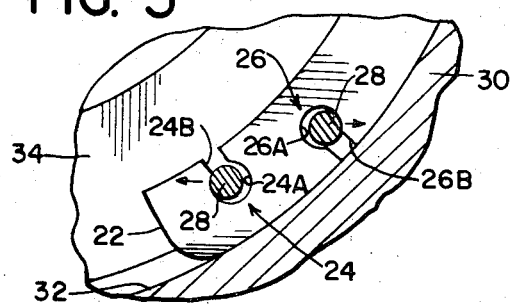
FIG. 5 is a fragmentary view on an enlarged scale showing one of the end portions of the split ring illustrated in FIG. 3.

In order to install each ring 14 in its groove 12 on shaft 10, rod-shaped working fingers 28 of ring-handling ring-handling tool, having finger diameters less than that of the closed ends 26A but greater than the transverse width of the radial extension of the slots 26, are inserted in the closed ends 26A (See FIG. 5) and pressure is applied outwardly, as indicated by the arrow, to expand the ring until its sharp corners clear the diameter of the groove. Then, the ring 14 is allowed to spring back so that its inner peripheral edge 18 seats snugly against the base of groove 12. As shown in FIG. 1, a sufficient amount of the closed ends 26A of slots 26 is exposed beyond the top of groove 12 to allow insertion and withdrawal of the fingers 28 when the ring 14 is in its installed position.

Figure 3:
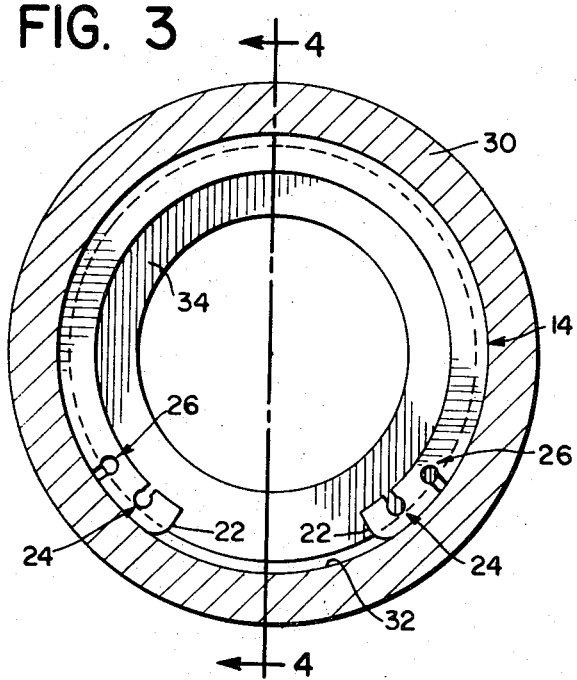
FIG. 3 is a transverse sectional view, taken along the plane of line 3–3 in FIG. 4, showing a split ring embodying the invention installed in an inwardly opening groove in a housing.
Figure 4:
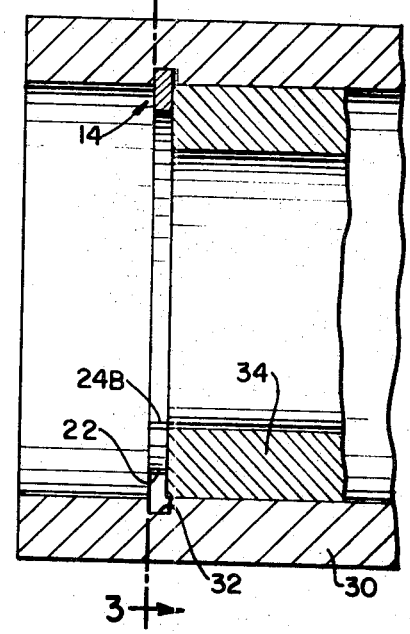
FIG. 4 is a longitudinal sectional view taken along the plane of line 4–4 in FIG. 3.

Referring now to FIGS. 3 and 4, a hollow housing 30 has an inwardly opening groove 32 in which the split ring 14 is installed to hold the machine part 34 against axial displacement relative to the housing. The ring 14 is identical to the one illustrated in FIGS. 1 and 2 and, for installation in the internal groove 32, is contracted by pressure applied by the fingers 28 in the inward direction indicated by the arrow in FIG. 5. During this contraction, the end portions of the ring 14 extending from the slots 26 to the tips 22 are free to flex and pivot resiliently about points coincident with or adjacent to the line traced by the closed ends 26A to assist in achieving sufficient deflection of the end portions for clearance of and entry into the internal bore of housing 30. To this end, the rounded corners between the outer peripheral edge 20 and the tips 22 of the end portions provide a further assist in achieving the required clearance. As in the case of the external installation in FIGS. 1 and 2, a sufficient portion of the closed ends 24A is exposed beyond the top of the internal groove 32 to allow free insertion and withdrawal of the working fingers 28 of the ring-handling tool.

It will be noted that when the ring 14 is expanded or contracted, the working fingers of the ring-handling tool partially project into the radially extending portions of slots 26 and 24. However, since the working fingers are thicker than the transverse width of these portions of the slots, the fingers cannot pass through the width and are securely retained in the closed ends of the slots to transmit the expansion or contraction pressure applied to the ring-handling tool.

The invention has been described in terms of its operating principles and a preferred embodiment thereof. Obvious variations can be made in the illustrated embodiment without departing from the spirit and scope of the invention. Therefore, the only limitations are to be determined from the appended claims.

I claim:

1. A retaining ring adapted to be installed in either an outwardly opening groove in a shaft or an inwardly opening groove in a housing to hold a machine part against axial displacement relative to the shaft or housing, said ring comprising a split ring of oblong rectangular cross section having opposite smooth parallel face portions and concentric inner and outer curved peripheral surfaces having diameters to seat in said outwardly opening groove and in said inwardly opening groove, respectively; the ends of the split ring being spaced apart and each end portion having a pair of slots; a first one of said slots in each pair being positioned relatively near to the tip of said end portion and having a closed end spaced from one of said inner and outer curved peripheral surfaces and extending substantially radially from said closed end to an open end at the other of said inner and outer curved peripheral surfaces, the second of said slots in each pair being positioned relatively farther from the tip of said end portion and having a closed end spaced from one of said inner and outer curved peripheral surfaces opposite to the one extending is spaced from the closed end of said first slot and extending substantially radially from said closed end to an open end at the other of said inner and outer curved peripheral surfaces opposite to the one at which the open end of said first slot is located, and the maximum transverse dimension bridging across the closed end of each slot being greater than the maximum transverse dimension of the radially extending portion of said slot.

2. A retaining ring according to claim 1, in which the open ends of said first slots are located at said inner curved peripheral surface and the open ends of said second slots are located at said outer curved peripheral surface.

3. A retaining ring according to claim 2, in which said inner curved peripheral surface intersects the tip of each said end portion at substantially right angles to form sharp corners at said intersections.

4. A retaining ring according to claim 2, in which said outer curved peripheral surface intersects the tip of each said end portion in smooth curves to form rounded corners at said intersections.

5. A retaining ring according to claim 2, in which said slots are each generally intersects the closed end of the slot forming a circular bulged portion of said keyhole shape and the substantially radial extension of the slot from its closed to open ends forming a substantially linear narrower portion of said keyhole shape.

6. A retaining ring according to claim 5, in which the closed ends of said keyhole-shaped, slots forming circular bulged portions of said keyhole shapes are centered on points displaced radially inwardly from the center line which divides the radial width of said ring in half and in which the closed ends of said second slots also forming circular bulged portions of said keyhole shapes are centered on points displaced radially outwardly from said center line.

7. A retaining ring according to claim 5, in which the diameters of the closed ends of all of said slots and the widths of the substantially radial extensions of all of said slots are longer and shorter, respectively, than the thickness of working fingers of a ring-handling tool to be pg,11 inserted in said closed ends for applying an expansion or contraction pressure to the ring during its installation.

7. A retaining ring according to claim 5, in which the diameters of the closed ends of all of said slots and the widths of the substantially radial extensions of all of said slots are longer and shorter, respectively, than the thickness of working fingers of a ring-handling tool to be inserted in said closed ends for applying an expansion or contraction pressure to the ring during its installation.